United States Patent [19]

Li et al.

[11] Patent Number: 5,759,237
[45] Date of Patent: Jun. 2, 1998

[54] PROCESS AND SYSTEM FOR SELECTIVE ABATEMENT OF REACTIVE GASES AND RECOVERY OF PERFLUOROCOMPOUND GASES

[75] Inventors: Yao-En Li, Buffalo Grove; Eric L. Duchateau, Clarendon Hills, both of Ill.

[73] Assignees: L'Air Liquide Societe Anonyme pour l'Etude et, l'Exploitation des Procedes Georges Claude, Paris, France; American Air Liquide Inc., Walnut Creek, Calif.

[21] Appl. No.: 663,884

[22] Filed: Jun. 14, 1996

[51] Int. Cl.$^6$ .......................... B01D 53/22; B01D 53/04
[52] U.S. Cl. ........................ 95/41; 95/45; 95/47; 95/53; 95/54; 95/128; 95/131; 95/142; 95/149; 96/4; 96/7; 96/108
[58] Field of Search .................. 95/45, 47, 52–55, 95/39, 41, 42, 128, 131, 142, 149; 96/4, 7, 8, 10

[56] References Cited

U.S. PATENT DOCUMENTS

| | | | |
|---|---|---|---|
| 2,947,687 | 8/1960 | Lee | 210/23 |
| 2,953,502 | 9/1960 | Binning et al. | 202/42 |
| 2,960,462 | 11/1960 | Lee et al. | 210/500.29 X |
| 2,970,106 | 1/1961 | Binning et al. | 208/347 |
| 3,508,994 | 4/1970 | Nyrop | 156/280 |

(List continued on next page.)

FOREIGN PATENT DOCUMENTS

| | | | |
|---|---|---|---|
| 60-099325 | 6/1985 | Japan | 95/53 |
| 62-042723 | 2/1987 | Japan | 95/52 |
| 63-175602 | 7/1988 | Japan | 95/52 |
| 2-014725 | 1/1990 | Japan | 95/52 |

OTHER PUBLICATIONS

"Technical Data Sheet." Circle Reader Service #106, (Air Products and Chemicals, Inc.) Distributed at SEMICON/ Southwest, Booth 2028, Austin, TX. Oct. 13, 1997.

Carson, William M.; Christian, Kimberly A.; Crossland, Eugene C.; Hsiung, Thomas H.; Ridgeway, Robert G.; and Yang, James H. "Large Scale PFC Capture System." (Air Products and Chemicals, Inc.) Presented at SEMICON Southwest, Austin, TX., Oct. 13, 1997.

Stannett, V.; and Williams, J. L. "The Permeability of Poly(ethyl Methacrylate) to Gases and Water Vapor." *Journal of Polymer Science*: Part C., No. 10, pp. 45–49, (1965).

Norton, Francis J. Gas Permeation through Lexan Polycarbonate Resin.: *Journal of Applied Polymer Science*, vol. 7, pp. 1649–1659, (1963).

Michael T. Mocella, *Perfluorocompound Emission Reduction from Semiconductor Processing Tools: An Overview of Options and Strategies*, Global Warming Symposium, Dallas, TX., Jun. 7–8, 1994.

Larry Anderson, *Vector Technology's Phoenix Combustor*, Global Warming Symposium, Dallas, TX., Jun. 7–8, 1994.

AT&T Microelectronics and Novapure Corp., *PFC Concentration and Recycle*, Global Warming Symposium, Dallas, TX., Jun. 7–8, 1994.

(List continued on next page.)

*Primary Examiner*—Robert Spitzer
*Attorney, Agent, or Firm*—Jeffrey L. Wendt

[57] ABSTRACT

Processes and systems to recover at least one perfluorocompound gas from a gas mixture are provided. In one embodiment the inventive process comprises the steps of a) providing a gas mixture comprising at least one perfluorocompound gas and at least one carrier gas, the gas mixture being at a predetermined pressure; b) providing at least one glassy polymer membrane having a feed side and a permeate side; c) contacting the feed side of the at least one membrane with the gas mixture; d) withdrawing from the feed side of the membrane as a non-permeate stream at a pressure which is substantially equal to the predetermined pressure a concentrated gas mixture comprising essentially the at least one perfluorocompound gas; and e) withdrawing from the permeate side of the membrane as a permeate stream a depleted gas mixture comprising essentially the at least one carrier gas.

33 Claims, 8 Drawing Sheets

U.S. PATENT DOCUMENTS

| | | | |
|---|---|---|---|
| 3,616,607 | 11/1971 | Klass et al. | 55/16 |
| 3,648,845 | 3/1972 | Riley | 210/500.29 X |
| 4,086,310 | 4/1978 | Bottenbruch et al. | 264/41 |
| 4,113,628 | 9/1978 | Alegranti | 210/500 M |
| 4,132,824 | 1/1979 | Kimura et al. | 428/220 |
| 4,155,793 | 5/1979 | Salemme et al. | 156/246 |
| 4,156,597 | 5/1979 | Browall | 55/16 |
| 4,192,824 | 3/1980 | Robinson et al. | 585/409 |
| 4,378,324 | 3/1983 | Makino et al. | 264/41 |
| 4,460,526 | 7/1984 | Makino et al. | 264/41 |
| 4,474,662 | 10/1984 | Makino et al. | 210/500.2 |
| 4,485,056 | 11/1984 | Makino et al. | 264/41 |
| 4,512,893 | 4/1985 | Makino et al. | 210/500.2 |
| 4,553,983 | 11/1985 | Baker | 55/16 |
| 4,602,922 | 7/1986 | Cabasso et al. | 55/158 |
| 4,664,669 | 5/1987 | Ohyabu et al. | 623/66 |
| 4,689,267 | 8/1987 | Takamizawa et al. | 428/376 |
| 4,695,358 | 9/1987 | Mizuno et al. | 204/174 |
| 4,701,187 | 10/1987 | Choe et al. | 95/54 X |
| 4,713,292 | 12/1987 | Takemura et al. | 428/373 |
| 4,714,481 | 12/1987 | Matsuura et al. | 55/158 |
| 4,717,393 | 1/1988 | Hayes | 95/54 X |
| 4,717,394 | 1/1988 | Hayes | 210/500.39 X |
| 4,741,829 | 5/1988 | Takemura et al. | 210/500.23 |
| 4,743,435 | 5/1988 | Kitahara et al. | 423/210 |
| 4,756,932 | 7/1988 | Puri | 427/175 |
| 4,784,837 | 11/1988 | Kitayama et al. | 423/210 |
| 4,826,599 | 5/1989 | Bikson et al. | 210/500.3 |
| 4,881,953 | 11/1989 | Prasad et al. | 95/54 X |
| 4,910,001 | 3/1990 | Kitahara et al. | 423/210 |
| 4,956,152 | 9/1990 | Keough et al. | 422/181 |
| 4,966,666 | 10/1990 | Waltonen | 204/164 |
| 4,996,030 | 2/1991 | Kitahara et al. | 423/210 |
| 5,009,869 | 4/1991 | Weinberg et al. | 95/45 X |
| 5,051,113 | 9/1991 | Nemser | 95/54 |
| 5,051,114 | 9/1991 | Nemser et al. | 95/47 |
| 5,053,059 | 10/1991 | Nemser | 95/54 |
| 5,061,462 | 10/1991 | Suzuki | 422/186.04 |
| 5,085,676 | 2/1992 | Ekiner et al. | 55/158 |
| 5,182,088 | 1/1993 | Leondaridis et al. | 423/210 |
| 5,215,554 | 6/1993 | Kramer et al. | 95/52 X |
| 5,256,295 | 10/1993 | Baker et al. | 95/45 X |
| 5,256,296 | 10/1993 | Baker et al. | 95/45 X |
| 5,281,255 | 1/1994 | Toy et al. | 95/50 |
| 5,288,304 | 2/1994 | Koros et al. | 95/54 X |
| 5,290,341 | 3/1994 | Barbe | 95/54 |
| 5,310,415 | 5/1994 | Simmons et al. | 95/54 X |
| 5,378,439 | 1/1995 | Delobel et al. | 423/210 |
| 5,501,722 | 3/1996 | Toy et al. | 95/45 X |

OTHER PUBLICATIONS

Air Liquide America Corporation, *SOLVAL™ Solvent Condensation and Recovery System*, Technical Bulletin, 1994.

Controlled Decomposition/Oxidation CDO™ Brochure from DELTECH Corp., pp. 1–8, Date Unknown.

Model 250 & 500 Scrubing Devices SD™ 250 & SD™ 500, Brochure from DELTECH Corp., 5 pgs., Date Unknown.

5,759,237

PROCESS AND SYSTEM FOR SELECTIVE ABATEMENT OF REACTIVE GASES AND RECOVERY OF PERFLUOROCOMPOUND GASES

CROSS-REFERENCE TO RELATED APPLICATIONS

This application is related to assignee's copending application Ser. No. 08/503,325, filed Jul. 17, 1995; and copending application Ser. Nos. 08/666,694 and 08/665,142, both filed Jun. 14, 1996, and Ser. No. 08/783,949, filed Jan. 16, 1997, all of which are incorporated by reference herein.

BACKGROUND OF THE INVENTION

1. Field of the Invention

The invention relates in general to processes and systems for treating a gas mixture containing both reactive and relatively inert gases. More particularly, the invention relates to the abatement of the reactive gases in a first stage, and separation and recovery (or disposal) of the inert gases in a second stage.

2. Related Art

The semiconductor industry is now using extensively perfluorocompounds such as $CF_4$, $C_2F_6$, $C_3F_8$, $C_4F_{10}$, $CHF_3$, $SF_6$, $NF_3$, and the like, in the semiconductor manufacturing processes involving gases, particularly in the various etching steps of the semiconductor manufacturing processes as well as in the chamber cleaning step of the manufacturing process. Those perfluorocompound gases are used either pure or diluted, for example with air or nitrogen or other inert gas or in admixture with other perfluorocompound gases or other carrier gases (for example inert gases). All of those gases do not necessarily react with other species during the manufacturing processes; accordingly, when reactors are cleaned or evacuated to carry out another step of the manufacturing process, the effluent gases or gas mixtures cannot be vented, even if they are largely diluted with air or any other gas such as inert gas, because most of these gases are known as having a potential effect on the earth global warming. Most of the perfluorocompounds (also called PFCs) have lifetimes measured in thousands of years in the atmosphere and are also strong infrared absorbers. In the "Global Warming Symposium" held on Jun. 7–8, 1994, in Dallas, Tex., USA, carbon tetrafluoride ($CF_4$), hexafluoroethane ($C_2F_6$), nitrogen trifluoride ($NF_3$), and sulfur hexafluoride ($SF_6$) have been identified as greenhouse gases of concern to the semiconductor industry.

In the presentation made at this symposium by Michael T. Mocella and entitled "Perfluorocompound Emission Reduction From Semiconductor Processing Tools: An Overview Of Options And Strategies", the various possible strategies to control emission of these gases in the atmosphere were explained.

Apart from process replacement by non PFCs, several methods are already known or under development for the abatement (destruction) of various gases which otherwise might be vented to the atmosphere. Some of these are being considered alone for the purpose of destroying PFCs:

Chemical-thermal decomposition, wherein reactive/hazardous gases such as $SiH_4$, $SiCl_4$, $WF_6$, $BCl_3$, $AsH_3$, $PH_3$, $Si(OC_2H_5)_4$ (tetraethyl orthosilicate, also known as "TEOS"), and the like react with various activated materials (for example metals) at high temperature to create a solid material (typically an inert stable inorganic salt) that is subsequently disposed of. This technique is presently considered as commercially unproven even if it is under promising development, and the contactors have limited capacity, with regular replacement of the active material required. This can be particularly troublesome for semiconductor manufacturers having multiple semiconductor manufacturing tools, each having dedicated abatement units (frequent replacement of one contactor with spares leaves no spares for the other contactors);

Combustion-based decomposition process using a flame to supply both the thermal energy and the reactants for the decomposition. Reactive/hazardous are typically mixed with an oxygen source and decomposed or oxidized in a high temperature reaction chamber. The effluent gases and particulates from the chamber typically comprise $F_2$, $SiO_2$, $P_2O_5$, depending upon the corresponding precursor gases, and are normally scrubbed out via a wet caustic solution. There are some safety issues associated with the hydrogen or natural gas fuels used in these combustion-based processes, and all the PFCs (if the combustion temperature is even high enough) will produce HF as a combustion product, whose emissions are also of concern and must be dealt with also. Further, as illustrated in FIG. 1, the destruction efficiency varies greatly within those gases commonly included in the category of PFCs (as discussed further herein), thus dictating a high combustion chamber temperature and sufficient residence time to ensure destruction of PFCs such as $CF_4$ and $C_2F_6$. A combustion system for destroying PFCs in high nitrogen content effluent gas streams is disclosed in the article entitled "Vector Technology's Phoenix Combustor" by Larry Anderson presented at the above-referenced Global Warming Symposium Jun. 7–8, 1994. This abatement system also uses a gas flame (using natural gas or hydrogen with air), which leads then to the same problem of HF generation and further destruction (plus the generation of $NO_x$, $CO_2$ inherent to any combustion process);

Plasma-based decomposition processes, which involve the use of a plasma (ioned gas chemistry) such as produced using coupled radio frequency systems. The gases to be destroyed are introduced into a plasma region and decomposed or reacted to form less hazardous or inert species. Chemically inert gases, such as $CF_4$, $C_2F_6$, and other relatively inert gases can pass through the plasma region without being destroyed. If oxygen is used to drive the decomposition of PFCs to inert species, however, generation of HF needs to be thereafter managed. There are two types of plasma abatement, one based upon the plasma enhanced chemical vapor deposition (PECVD), while the other is based upon gas phase plasma reactions. In PECVD processes, the hazardous gases pass through the plasma and react with an electrode to depletion. Surface recombination reactions strip and deposit solid components of the hazardous gases on the electrode as solid dense films. The electrodes have limited collection capacity, and must be replaced regularly. In the gas phase plasma reactions, the hazardous reactive gases are reacted and decomposed into other, more inert species. Some of the resulting species may be scrubbed out via either dry or wet scrubbing techniques, depending on the species produced. Of course, the hazardous gases must be relatively easy to ionize to be reactive. In the case of PFCs this is not always the case.

Thus, some of the above-mentioned abatement technologies which are being evaluated for the destruction of PFCs are quite inefficient and costly, due primarily to the inherent stability of PFCs.

Recovery processes wherein the PFCs are recovered instead of being destroyed in order to be recycled have been discussed in the literature (in the Mocella article mentioned above, for example). This kind of process is of a great interest because it is considered as the "greenest" one. Different schemes, according to the author, are possible "based on combinations of adsorption or low temperature trapping of PFCs". There are, however, several challenges such as dealing with the large amount of nitrogen associated with the pump operation, the close boiling points of $CF_4$ and $NF_3$, the mixing of various process streams and/or possible reactions with adsorbents. While recycle is suggested, there are obvious questions about recycling such mixtures.

In an article presented at the Jun. 7–8, 1994 Global Warming Symposium by AT&T Microelectronics and Novapure Corporation, entitled "PFC Concentration and Recycle", the authors acknowledge the advantages of the recovery processes which avoid production of carbon dioxide, $NO_x$ and EF (compared to combustion processes). Briefly, this process is disclosed as the use of a dual bed adsorber (activated carbon), wherein one of the beds is in the adsorption mode, while the second bed is regenerated: the PFCs are adsorbed on the carbon sieves while the "carrier" gases, such as nitrogen, hydrogen are not adsorbed and are vented to the exhaust system. When the system is switched on the second adsorber, the first one is evacuated using a vacuum pump, the effluent recompressed and the PFC gas mixture is recovered. One of the issues not yet resolved with such a system is that $CF_4$, which is nonpolar, is not readily adsorbed by the carbon sieve and is then rejected with the vent gases. Also, any adsorption system is very sensitive to moisture and any trace of water has to be removed from the feed flow.

It is also known from U.S. Pat. No. 5,281,255 to use membranes made of rubbery polymers such as polydimethylsiloxane or certain particular polymers such as a substituted polyacethylene (having a low glass transition temperature), to recover condensable organic components having a boiling point higher than −50° C., essentially hydrocarbons ($CH_4$, $C_2H_6$, and the like), said hydrocarbons having the property of permeating through said membranes much faster than air, and then recovering on the permeate side of the membrane said hydrocarbons. The permeate (hydrocarbons) is then recovered at either substantially atmospheric pressure or lower pressure while the non-permeate (e.g. air) is still at the original pressure of the feed stream but is vented, which means that such system is not energy efficient, all the energy of the feed stream (pressure) being lost.

Also, it is disclosed in International Publication No. WO 90/15662 published Dec. 27, 1990 a selectively permeable membrane formed from an amorphous polymer of perfluoro-2,2-dimethyl-1,3-dioxole which is usable for separation of hydrocarbons or chlorofluorocarbons from, for example, air. Such a particular membrane apparently permeates oxygen and nitrogen faster than hydrocarbons and chlorofluorocarbons which can be recovered unexpectedly on the non-permeate side of the membrane, contrary to all of the membranes, including those disclosed in U.S. Pat. Nos. 4,553,983 and 5,281,255. In this PCT application, there is also disclosed a mixture of the amorphous polymer of perfluoro-2,2-dimethyl-1,3-dioxole and polytetrafluoroethylene. All these perfluoro polymers are known to be resistant to most of the harmful chlorofluorocarbons and hydrocarbons which make them commercially suitable for such separation. However, this membrane is not currently available and there is no indication in this patent application whether or not such a membrane is suitable for separation of PFCs from air or nitrogen.

There is still presently a need for improved "green" processes for abatement of reactive (and potentially harmful) gases and concentration and/or recovery of inert gases (such as PFCs) from a gaseous stream. There is especially a need for processes and systems which can be used with a feed flow comprising or saturated with moisture, which can handle safely the PFCs recovery and/or concentration even with important or extreme variations of flows and/or concentration of PFCs in the feed stream, and which addresses the production of hydrofluoric acid (HF) as a residue from the destruction of the PFCs (in addition to the possible HF content of the feed gas).

SUMMARY OF THE INVENTION

It has now been unexpectedly found that gas mixtures, for example, an effluent of a semiconductor manufacturing process, which comprise both reactive gases and relatively inert gases, such as perfluorocompounds, can be treated more efficiently by combining an abatement step with a recovery step. The abatement step comprises one or more known abatement techniques, during which the reactive materials (and perhaps some of the "inert" gases) are selectively transformed into one or more chemically stable species. The recovery step comprises the use of certain, preferably hollow fiber, membranes which permeate much faster "carrier gases" of the gas mixture, such as air, nitrogen, oxygen, argon and/or helium, than the inert gases (preferably perfluorocompounds) of the gas mixture which are then recovered on the non-permeate (feed) side of the membrane.

One aspect of the invention relates to a process to recover at least one perfluorocompound gas from a gas mixture comprising reactive gases, perfluorocompound gases, and carrier gases, the process comprising the steps of:

a) providing a gas mixture comprising at least one perfluorocompound gas, at least one carrier gas, and at least one reactive gas, the gas mixture being at a predetermined pressure;

b) directing the gas mixture to an abatement unit, wherein the reactive gases, and preferably only a minor portion of the perfluorocompound gases and carrier gases in the gas mixture, are converted into substantially inert (preferably particulate) species, and thereby forming an intermediate gas mixture consisting essentially of the perfluorocompound gases and the carrier gases;

c) providing at least one glassy polymer membrane having a feed side and a permeate side, the membrane being permeable to the at least one carrier gas and being non-permeable to the at least one perfluorocompound gases;

d) contacting the feed side of the at least one membrane with the intermediate gas mixture;

e) withdrawing from the feed side of the membrane as a first non-permeate stream at a pressure which is substantially equal to the predetermined pressure, a concentrated gas mixture comprising essentially the at least one perfluorocompound gas; and f) withdrawing from the permeate side of the at least one membrane as a permeate stream a depleted gas mixture consisting essentially of the at least one carrier gas.

A preferred process in accordance with the invention is that wherein the gas mixture is an effluent from a semiconductor manufacturing tool, and the non-permeate stream is recycled to (or liquified for storage for future use in) the feed stream of the same or another semiconductor manufacturing tool. The semiconductor manufacturing process may be selected from etching processes including oxide, metal and dielectric; deposition processes including silicon CVD, tungsten backetching, dry chamber cleaning, and the like. Further understanding may be had with reference to assignee's copending applications Ser. No. 08/665,142, filed Jun. 14, 1996, and Ser. No. 08/783,949, filed Jan. 16, 1997 previously incorporated herein by reference.

Preferred membranes for use in the systems and processes of the invention are glassy polymeric membranes, more preferably asymmetric or composite (with an asymmetric outer layer) membranes. Preferably, these glassy polymeric membranes do not include perfluorinated membranes. However, the glassy polymeric membranes used in accordance with the invention can comprise a layer, including a post treatment layer as disclosed in U.S. Ser. No. 08/138,309 filed Oct. 21, 1993, and which is incorporated herein by reference, made of a fluorinated polymer such as polytetrafluoroethylene, amorphous perfluoro-2,2dimethyl-1,3-dioxide, and the like.

As some of the glassy membranes are sensitive to certain products which may be harmful for them, i.e. which may destroy or plug them quickly, it is preferred to remove the harmful species from the intermediate gas mixture prior to sending it to the membrane. Preferably any kind of species which is present in the intermediate gas which may harm the membrane is removed by a scrubbing step after step (b) and before step (d) of the inventive process, including any harmful gaseous HF, $NH_3$, $WF_6$, $O_3$, $BCl_3$, and any corrosive species, also any pyrophoric species including silicon hydrides such as $SiH_4$, but also any kind of particulates and any oil mists. Indeed, it is preferred that compressors used in the methods and systems of the invention be sealed and oil-free.

According to a preferred process of the invention, after concentrating the PFCs with a membrane, the various PFCs are separated from each other, by well known methods per se, such as selective condensation or adsorption in order to recover either separate PFCs or mixtures of PFCs having close boiling points. According to another preferred embodiment of the invention, the PFCs gas mixture is concentrated again, for example, with a second or more membranes, or the PFCs gas mixture is stored or recycled in the process (with or without additional treatment).

Another aspect of the invention is a system combining abatement and recovery units for treating gas mixtures comprising a perfluorocompound gas, a reactive gas, and a carrier gas, the combination comprising:

a) an abatement unit adapted to receive the gas mixture, the abatement unit selected from the group consisting of combustion, thermal-chemical, plasma decomposers, pulsed corona reactors, and combinations thereof, the abatement unit adapted to produce an intermediate gas mixture consisting essentially of the perfluorocompound gas and the carrier gas;

b) at least one membrane separation unit having a feed side and a permeate side, and comprising a plurality of glassy polymer hollow fibers, the glassy polymer hollow fibers being permeable to the carrier gas and being substantially non-permeable to at least one perfluorocompound gas, the membrane unit connected to the abatement unit via an abatement unit effluent conduit, the membrane unit having a permeate vent conduit and a non-permeate conduit.

Preferred system embodiments include the provision of connecting the non-permeate conduit to a process which may use the perflurocompound gases, such as a semiconductor s manufacturing tool. Also as herein disclosed, a plurality of membrane units may be arranged in series, either with or without provision of sweep gas of non-permeate on the permeate side of one or all membranes. Further preferred embodiments of systems of the invention include a damper or surge tank in the non-permeate conduit (i.e. between the first or plurality of membrane units and the semiconductor manufacturing tool); and the provision of a compressor, heat exchanger, cryogenic pump or vacuum pump on one or more of the non-permeate, PFC enriched stream(s), allowing the PFC enriched stream(s) to be stored in liquid form for future use. Also preferred are appropriate valves which allow the damper or surge tank, and the compressor for creating the liquid PFC mixture, to be bypassed, as explained more fully herein. Also, the abatement units may be point of use (i.e. one abatement unit per gas mixture to be treated), general (i.e. one abatement unit for treatment of multiple gas mixtures), or combination of these.

Preferred system embodiments of the invention comprise:

a) an abatement unit adapted to receive the gas mixture, the abatement unit selected from the group consisting of combustion, thermal-chemical, plasma decomposers, pulsed corona reactors, and combinations thereof, the abatement unit adapted to produce an intermediate gas mixture consisting essentially of the perfluorocompound gas and the carrier gas;

b) a compressor connected to the abatement unit through an abatement unit discharge conduit, the compressor adapted to provide a compressed intermediate gas mixture through a compressor discharge conduit;

c) optional heating or cooling means in the compressor discharge conduit adapted to provide a desired compressed intermediate gas temperature; and d) at least one membrane separation unit having a feed side and a permeate side, and comprising a plurality of glassy polymer hollow fibers, the glassy polymer hollow fibers being permeable to the carrier gas and being substantially non-permeable to at least one perfluorocompound gas, the membrane unit connected to the compressor via the compressor discharge conduit, the membrane unit having a permeate vent conduit and a non-permeate conduit.

Other preferred process and system aspects of the invention include provision of a process step where the PFC gas mixture is concentrated using a plurality of membranes arranged in series, with the possibility of the concentrated PFC gas mixture from each membrane unit being capable of use as a sweep gas of the permeate side of any one of or all of the membrane units in the series.

Preferred systems in accordance with the invention include provision of post-treatment means, such as dry or wet, (or both) scrubbers, thermal decomposers, catalytic decomposers, plasma gas decomposers, pulsed corona reactors, and various filters as herein disclosed, prior to the non-permeate stream entering the semiconductor manufacturing tool.

Membrane units useful in the invention may be operated at a constant concentration set-point for the PFC concentration in the non-permeate stream from each membrane unit. In this preferred system and process, the set-point concentration of the PFC in the non-permeate stream from each succeeding PFC membrane separation unit would of course be higher than the immediately preceding one. Appropriate sensors can be inserted into the non-permeate effluent conduit from each membrane unit to continuously or noncontinuously analyze for PFC concentration, or, samples may be taken periodically or continuously from the non-permeate effluent from each membrane unit, which may be sent to dedicated analyzers either on-site or off-site. This information is preferably then forwarded to a process controller which may control for example the pressure of the feed to each membrane unit, temperature, flow, and the like. Also, when discussing the use of a sweep gas arrangement, the sweep gas may either be controlled via an open loop or a closed loop arrangement.

Other preferred processes and systems of the invention are those wherein a waste stream from an abatement unit (either pretreatment or or post-treatment) is used to generate one or more perfluorocompounds, or other useful species, which may then be purified for use or sale, as further disclosed and claimed in copending U.S. Ser. No. 08/666, 694, filed Jun. 14, 1996, earlier incorporated herein by reference.

Further understanding of the processes and systems of the invention will be understood with reference to the brief description of the drawing and detailed description which follows herein.

DESCRIPTION OF PREFERRED EMBODIMENTS

Figure 1:
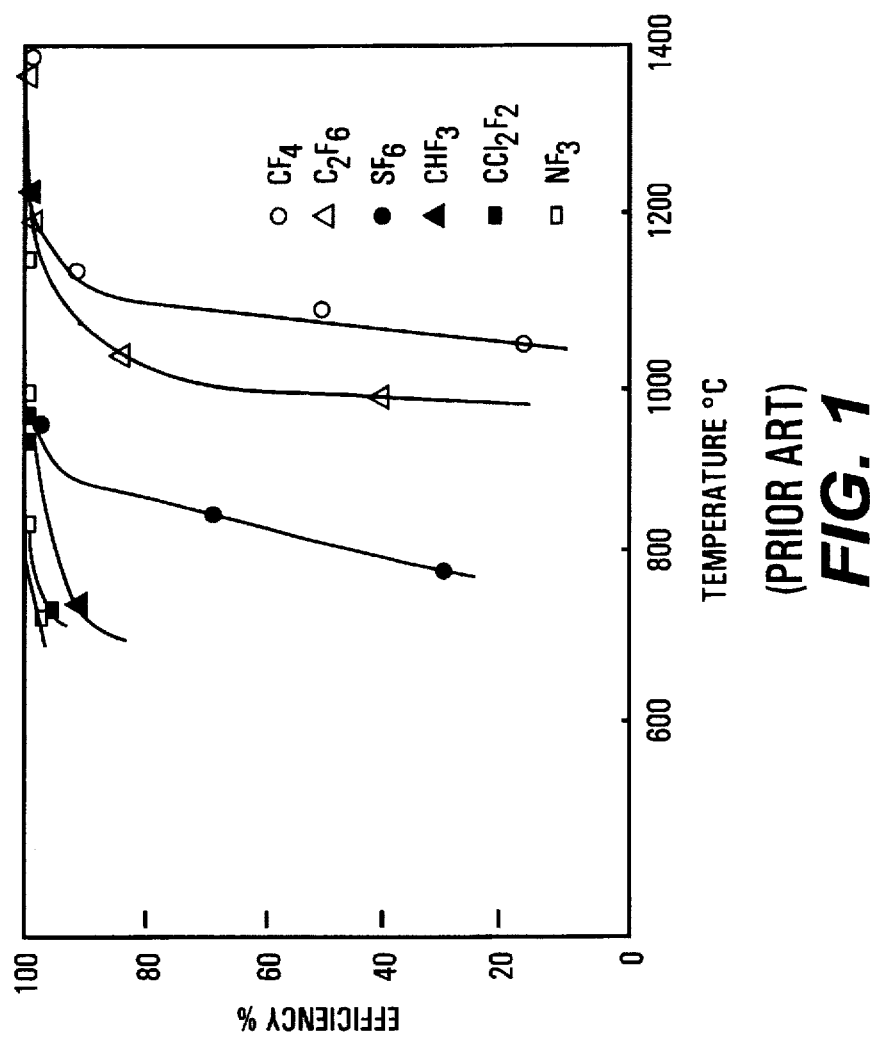
FIG. 1 is a graph illustrating the efficacy of destruction of PFCs with a burner versus the burner flame temperature (prior art)

Using the teachings of the present invention it is feasible to abate reactive gases and recover perfluorocompound gases from a gas mixture containing both. The combination of abatement and recovery steps has the advantage of increasing the efficiency of use of PFCs, so that less PFCs have to be used to replace those molecules lost to the atmosphere. This has importance in the refrigeration and semiconductor fields.

Efficient use of PFCs, for example, in a semiconductor manufacturing process, is now made possible by the present invention using essentially a two step process: abatement of relatively reactive gases, and recovery of more stable, relatively inert PFCs using certain types of polymer membranes and concentrating a gas mixture comprising PFCs by recovering the non-permeate flow on the non-permeate side of the membrane.

Perfluorocompounds

Perfluorocompounds, for the purpose of this invention, are defined as compounds comprising C, S and/or N atoms wherein all or all but one hydrogen have been replaced by fluorine. The most common PFCs include, without being limited to, any of the following compounds: fully fluorinated hydrocarbons such as $CF_4$, $C_2F_6$, $C_3F_8$, $C_4F_{10}$, and other fluorinated compounds such as $CHF_3$, $SF_6$, $NF_3$, and which are not harmful for the membrane. In certain cases, PFCs may also include $BF_3$, $COF_2$, $F_2$, $HF$, $SiF_4$, $WF_6$, $WOF_4$, as long as they are not harmful for certain types of membranes. Perfluorocompounds do not include chlorofluorocarbons, or compounds comprising two hydrogen substituents or more, since such compounds do not usually behave as PFCs vis a vis the membrane and are not useful in semiconductor manufacturing processes. The gas mixture containing PFCs to be separated usually comprises at least one PFC and at least one carrier gas such as air, nitrogen, argon, helium, or the like and mixtures thereof.

In Table I are listed the most usual PFCs and other gases from waste streams from a semiconductor manufacturing process (not all of those gases are necessarily present—only some of them may be present in the exhaust).

The most common PFCs are usually the following ones:

for chamber cleaning: carbon tetrafluoride ($CF_4$), hexafluoroethane ($C_2F_6$), nitrogen trifluoride ($NF_3$), perfluoropropane ($C_3F_8$), sulfur hexafluoride ($SF_6$), trifluoromethane ($CHF_3$);

for the etching steps, the same PFCs are usually used but with several other gases such as argon, boron trichloride, chlorine, hydrogen bromide, hydrogen chloride, hydrogen fluoride, phosphine, silane, silicon tetrachloride, and the like.

Some of these gases are sometimes harmful for the membrane (as indicated in Table I), and it is preferred to remove them or destroy them from the feed gas mixture sent to the membrane. Usually it is preferred to remove the following compounds prior to sending the flow to the membrane: $WF_6$, $HF$, $F_2$, $NH_3$, $Cl_2$, $HBr$, $HCl$, $O_3$, and any silicon hydrides, germanium hydrides, and the like. To do this, various methods can be used such as using scrubber means (dry or wet scrubbers), thermal decomposition, plasma destruction, catalytic removal, and the like, to reach a level usually below about 1% vol. of said harmful substance in the feed. However, it is preferred to reach a level for each harmful substance lower than 10 ppm, most preferably lower than 1 ppm. It is also possible to treat the separated PFC non-permeate stream using one or more of those methods, referred to herein as post-treatment.

TABLE I

| Symbol | Name | Harmful to membrane |
|---|---|---|
| PFCs | | |
| $C_2F_6$ | Hexafluoroethane | not harmful |
| $CF_4$ | Tetrafluoromethane | not harmful |
| $CHF_3$ | Trifluoromethane | not harmful |
| $NF_3$ | Trifluoride | not harmful |

TABLE I-continued

| Symbol | Name | Harmful to membrane |
|---|---|---|
| $SF_6$ | Sulfur hexafluoride | not harmful |
| $C_3F_8$ | Perafluoropropane | not harmful |
| $COF_2$ | Carbonyl fluoride | not harmful |
| Other gases (carrier gases, etc.) | | |
| Ar | Argon | not harmful |
| $AsH_3$ | Arsine | not harmful |
| $BCl_3$ | Boron trichloride | not harmful |
| $BF_3$ | Boron trifluoride | not harmful |
| $CH_3OH$ | Methanol | not harmful |
| Cl2 | Chlorine | harmful above 1% |
| $F_2$ | Fluorine | harmful above 1% |
| $H_2$ | Hydrogen | not harmful |
| HBr | Hydrogen bromide | harmful above 1% |
| HCl | Hydrogen chloride | harmful above 1% |
| HF | Hydrogen fluoride | harmful above 1% |
| He | Helium | not harmful |
| $N_2$ | Nitrogen | not harmful |
| $N_2O$ | Nitrous oxide | not harmful |
| $NH_3$ | Ammonia | harmful above 1% |
| NO | Nitric oxide | not harmful |
| $O_2$ | Oxygen | not harmful |
| $O_3$ | Ozone | harmful above 1% |
| $PH_3$ | Phosphine | not harmful |
| $Si(OC_2H_5)_4$ | Tetraethyl Orthosilicate (TEOS) | not harmful |
| $SiF_4$ | Silicon tetrafluoride | not harmful |
| $SiH_4$ | Silane | harmful above 1% |
| $WF_6$ | Tungsten hexafluoride | harmful above 1% |
| $WOF_4$ | Tungsten tetrafluoride oxide | not harmful |

$SiF_4$, $WF_6$, $WOF_4$, HF, $F_2$ while being perfluorinated compounds are usually not considered as PFCs.

Reactive Gases

Reactive gases may be any gas which can be abated to a reasonable extent by one or more methods, such combustion, plasma, pulsed corona discharge, and the like. Representative examples of reactive gases include $SiH_4$, $SiCl_4$, $WF_6$, $BCl_3$, $AsH_3$, $NH_3$, $PH_3$, tetraethyl orthosilicate (TEOS), and the like (note that some of these are also in Table 1).

Abatement Step

The abatement step may comprise one or more abatement units, and may include more than one type of abatement technique.

1) Combustion

FIG. 1 illustrates the efficacy of a burner to destroy PFCs versus temperature (°C.) in a prior art process. For example, when an air-fuel burner is used, the temperature of the flame which is reached, if almost 100% of $NF_3$, $CCl_2F_2$ (which is not a PFC but is chlorofluorocompound used by the electronic industry), $CHF_3$ and $SF_6$ are destroyed (generating HF and other undesirable species), $C_2F_6$ and $CF_4$ are only partially destroyed, particularly $C_2F_6$ which is only 50% destroyed: the combustion gases cannot accordingly be vented. However, when using an oxy-fuel flame which temperature is about 1400° C., it is possible to destroy most of the $C_2F_6$, while still generating undesirable species.

A suitable combustion abatement unit is that known under the trade designation CDO, available from Delatech Corporation, which comprises an oxygenator section and a thermal reaction section where decomposition and oxidation occurs.

2) Chemical-thermal

Chemical-thermal methods are one of a number of preferred methods of abating undesirable gases. Typically, thermal techniques generate conditions within a reactor under which breakdown of undesirable molecules is achieved by heating the gas mixture to a high temperature; such temperatures ranging from about 200° C. to about 1500° C. The temperature used, typically provided by electrical resistance heating, is preferably only high enough to destroy the molecules of interest, but not excessively high so as to make the process energy inefficient. This is because the effluent gas stream from this type of abatement unit needs to be cooled in order that the steam may be compressed, or routed directly to the polymeric membrane separation unit.

3) Plasma discharge

Another method for breakdown of undesirable gases which is usefull in the present invention involves the use of non-thermal plasmas within the reactor. Dielectric barrier types of non-thermal plasma reactors are disclosed for example in U.S. Pat. Nos. 4,956,152, 4,966,666 and 5,061,462 to Keough et al., Waltonen and Suzuki, respectively, incorporated by reference herein. Such non-thermal plasma systems utilize rotating spark gaps, constant voltage resistive charging and use of elements to form the desired high-voltage pulses.

4) Pulsed corona discharge

Pulsed corona discharge is another preferred abatement method. Conventional pulsed corona discharge units, as described in U.S. Pat. No. 4,695,358 to Mizuno et al., may be preferred. More preferred are the pulsed corona systems disclosed in U.S. Pat. No. 5,490,573, incorporated herein by reference. In accordance with this patent, discharge conditions within a pulsed corona reactor are controlled to optimize the efficiency of chemical breakdown of undesirables. Electrical efficiency is maximized by charging a capacitor from a constant current supply of power, by resonantly transfering energy to the reactor using hydrogen spark gap switching and by suppressing thermal arcing via disabling the power supply after the current monitor detects a streamer discharge. These operational aspects are preferably performed within an integrated geometrical arrangement of apparatus which virtually eliminates electromagnetic interference with surrounding equipment and allows adjustment of discharge conditions within the chamber of the pulsed corona reactor in order to select optimizing pulse parameters and scaling to accommodate different flow rates of inflowing hazardous gases. The reactor preferably includes a plurality of individual corona discharge modules electrically connected in parallel to a switching assembly.

Recovery Step

Membranes useful in the invention are preferably glassy membranes, such as polymer membranes made preferably from polyimides, polyamides, polyamide-imides, polyesters, polycarbonates, polysulfones, polyethersulfone, polyetherketone, alkyl substituted aromatic polyesters, blends of polyethersulfone, aromatic polyimides, aromatic polyamides, polyamides-imides, fluorinated aromatic polyimide, polyamide and polyamideimides, glassy polymeric membranes such as disclosed in U.S. Ser. No. 08/247,125 filed May 20, 1994 and incorporated herein by reference, cellulose acetates, and blends thereof, copolymers thereof, substituted polymers (e.g. alkyl, aryl) thereof and the like.

Asymmetric membranes are prepared by the precipitation of polymer solutions in solvent-miscible nonsolvents. Such membranes are typified by a dense separating layer supported on an anisotropic substrate of a graded porosity and are generally prepared in one step. Examples of such membranes and their methods of manufacture are disclosed in U.S. Pat. Nos. 4,113,628; 4,378,324; 4,460,526; 4,474,662; 4,485,056; 4,512,893, 5,085,676, and 4,717,394 all incorporated herein by reference. The '394 and '676 patents disclose preparation of asymmetric separation membranes from selected polyimides. Particularly preferred membranes are polyimide asymmetric gas separation membranes as disclosed in the '676 patent.

In a pressure driven gas membrane separation process, one side of the gas separation membrane is contacted with a complex multicomponent gas mixture and certain of the gases of the mixture permeate through the membrane faster than the other gases. Gas separation membranes thereby allow some gases to permeate through them while serving as a barrier to other gases in a relative sense. The relative gas permeation rate through the membrane is a property of the membrane material composition and its morphology. It has been suggested in the prior art that the intrinsic permeability of a polymer membrane is a combination of gas diffusion through the membrane, controlled in part by the packing and molecular free volume of the material, and gas solubility within the material. Selectivity is the ratio of the permeability's of two gases being separated by a material. It is also highly desirable to form defect-free dense separating layers in order to retain high gas selectivity.

Composite gas separation membranes typically have a dense separating layer on a preformed microporous substrate. The separating layer and the substrate are usually different in composition. Composite gas separation membranes have evolved to a structure of an ultrathin, dense separating layer supported on an anisotropic, microporous substrate. These composite membrane structures can be prepared by laminating a preformed ultrathin dense separating layer on top of a preformed anisotropic support membrane. Examples of such membranes and their methods of manufacture are disclosed in U.S. Pat. Nos. 4,664,669; 4,689,267; 4,741,829; 2,947,687; 2,953,502; 3,616,607; 4,714,481; 4,602,922; 2,970,106; 2,960,462; 4,713,292, 4,086,310; 4,132,824; 4,192,824; 4,155,793; and 4,156,597, all incorporated herein by reference.

Alternatively, composite gas separation membranes may be prepared by multistep fabrication processes, wherein first an anisotropic, porous substrate is formed, followed by contacting the substrate with a membrane-forming solution. Examples of such methods are described in U.S. Pat. Nos. 4,826,599; 3,648,845; and 3,508,994, all incorporated herein by reference.

U.S. Pat. No. 4,756,932 describes how composite hollow-fiber membranes may also be prepared by co-extrusion of multiple polymer solution layers, followed by precipitation in a solvent-miscible nonsolvent.

According to one embodiment of the present invention, the membrane can be post-treated with, or coated by, or coextruded with, a fluorinated or perfluorinated polymer layer in order to increase its ability to withstand harmful constituents in the gas mixture from which PFCs are to be separated, at low levels or temporary contact with such components.

The hollow-fiber spinning process depends on many variables which may affect the morphology and properties of the hollow-fiber membrane. These variables include the composition of the polymer solution employed to form the fiber, the composition of fluid injected into the bore of the hollow-fiber extrudate during spinning, the temperature of the spinneret, the coagulation medium employed to treat the hollow-fiber extrudate, the temperature of the coagulation medium, the rapidity of coagulation of the polymer, the rate of extrusion of the fiber, takeup speed of the fiber onto the takeup roll, and the like.

According to a preferred aspect of the invention, there exist some relationship between the pressure drop across the membrane (i.e. ΔP between the feed and the permeate), the temperature of the feed (i.e. the temperature of the membrane after temperature equilibration between the feed flow and the membrane itself) and the feed flowrate. It has been discovered that, for a certain constant flowrate of the feed gas on the membrane and temperature of the feed gas, when the pressure differential across the membrane increases, the recovery of PFCs like e.g. $C_2F_6$ decreases on the non-permeate or "residue" side of the membrane while this PFCs concentration increases on the permeate side of the membrane. Accordingly, it is preferred, according to the invention, to have a pressure drop ΔP across the membrane which is not high, usually smaller than about 13,600 kPa (2000 psig), preferably ranging from about 120 to about 1450 kPa (from about 3 to about 200 psig) and most preferably from about 240 and to about 510 kPa (from about 20 to about 60 psig).

As far as the feed gas mixture is usually obtained at substantially atmospheric pressure, there is either the option to compress this feed to have a sufficient pressure drop across the membrane (but this is not preferred because usually, many of the species present in the feed may deteriorate the compressor) or create on the permeate side of the membrane a pressure lower than atmospheric pressure (which may be preferred because most of the species which may harm the vacuum means are retained on the non-permeate of the membrane). To create this lowered pressure on the permeate side of the membrane, a vacuum pump or any other suction means is usually adequate. Alternatively, if the feed stream to the membrane is to be compressed, compression is preferably carried out after the feed stream has been pretreated using wet or dry scrubbers, filters, catalytic removal, thermal decomposition, and/or plasma decomposition, as explained in copending application Ser. No. 08/665,142, filed Jun. 14, 1996 incorporated herein by reference. Preferred compressors are sealed and oil-free, such as the compressors known under the trade designation POWEREX, available from the Powerex Harrison Company, of Ohio, USA. Compression ratio (defined as the ratio of pressure at the compressor outlet divided by the pressure at the compressor inlet) of the compressor which feeds the membrane unit (or the first membrane unit of a series of membrane units) generally ranges from about 2:1 to about 10:1, it being appreciated that supplemental compression may be required at other membrane feed locations in a series of membrane units. It may be necessary to provide heat exchange between the compressed feed stream and a coolant, such as liquid nitrogen, for example if the temperature and/or pressure of the feed flowing into a particular membrane is to be controlled, or the PFC concentration in the non-permeate stream is controlled at a set-point value, as disclosed herein.

Whatever pressure drop across the membrane is chosen, according to the disclosure given hereabove, it is preferred to have a higher feed flow than a lower feed flow (even if such a system can work with a variable flowrate of the feed): the highest the feed flow, the highest the recovery. This feed flow can vary from near zero to about $10^5$ $Nm^3/h$ per square meter of membrane available for separation, preferably from about $10^{-4}$ to about 10 $Nm^3/h\text{-}m^2$, and more preferably from about 0.1 to about 0.5 $Nm^3/h\text{-}m^2$.

Alternatively, the compressor may be positioned after the pretreatment means (dry and/or wet scrubbers, filters, and the like).

The temperature of the feed flow and/or the membrane shall also have an influence on the recovery of PFCs on the non-permeate side of the membrane. Usually, when the feed and/or the membrane temperature increases, then for a constant flowrate and pressure drop, the species of the gas mixture tend to permeate more through the membrane, particularly those which already permeate faster at lower temperature. For example, nitrogen and oxygen (air) which permeate much faster through the membrane than the PFCs at ambient temperature will permeate even much faster through the membrane at higher temperature, e.g. 50° C. to 60° C.

Usually, the temperature of the feed and/or the membrane can vary from about −10° C. to about 100° C., preferably from about 10° C. to about 80° C., and particularly preferably ranging from ambient temperature (usually about 20° C. to 25° C.) to about 60° C.

Preferred processes and systems of the invention include operating one or more of the membrane units at a constant concentration set-point for the PFC concentration in the non-permeate stream from each membrane unit. In this preferred system and process, the set-point concentration of the PFC in the non-permeate stream from each succeeding PFC membrane separation unit would of course be higher than the immediately preceding one. Appropriate sensors can be inserted into the non-permeate effluent conduit from each membrane unit to continuously or non-continuously analyze for PFC concentration, or, samples may be taken periodically or continuously from the non-permeate effluent from each membrane unit, which may be sent to dedicated analyzers either on-site or off-site. This information is preferably then forwarded to a process controller which may control for example the pressure of the feed to each membrane unit, temperature, flow, and the like. Also, when discussing the use of a sweep gas arrangement, the sweep gas may either be controlled via an open loop or a closed loop arrangement.

Another preferred system and process embodiment of the present invention includes the recycle of the permeate stream of either the first or succeeding stages of the membrane units (in other words, the carrier gas and other process gases are recycled). The carrier gases may be recycled directly to the reactor chambers, or may be delivered to heat exchangers, compressors, and the like to reduce them to liquid form for storage or future use. A recycle membrane may be provided, functioning to separate air gases from process gases.

Other preferred processes and systems of the invention are those wherein a waste stream from a pretreatment step for the gas mixture emanating from the semiconductor process is used to generate one or more perfluorocompounds or other chemicals, which may then be purified for use in the semiconductor process, or other chemical processes, as more specifically described in assignee's copending application Ser. No. 08/666,694, filed Jun. 14, 1996 which was previously incorporated herein by reference.

After this first concentration step with one or a plurality of membranes, it is preferred to then carry out a second step wherein the various PFCs are at least partially separated from each other. Different separation techniques for separating two or more perfluorocompounds can be used such as distillation, adsorption, condensation, and the like. Preferably, and because it may be more appropriate for the streams which are coming out of a semiconductor manufacturing tool, a condensation process can be used such as the one known under the tradename SOLVAL of Air Liquide America Corporation disclosed in the Technical Bulletin entitled "Solval™ Solvent Condensation and Recovery System", 1994, and incorporated herein by reference. Basically, in this condensation process, the effluent from the non-permeate side of one or a plurality of membranes is fed into a heat exchanger. Liquid nitrogen or another cooling medium is introduced into the heat exchanger and flows through the cooling coils. The mixture of PFC with $N_2$ is introduced into the shell of the heat exchanger and flows around the coils as it passes through the shell. The mixture is cooled and part of the PFC vapors are coalesced, liquefied and collected based upon the temperature at the cooling coils. The higher the liquid nitrogen flowrate into the exchanger, the lower the temperature at the cooling coils, and therefore, more of PFCs will be liquefied.

In some preferred embodiments, the PFC mixture after concentration comprises species whose boiling points are close and it is therefore difficult to separate them by fractional condensation. For example, $C_2F_6$ has a normal boiling point of −78.2° C. and $CHF_3$ has a normal boiling point of −82.1° C.; $CF_4$ has a normal boiling point of −127.9° C. and $NF_3$ has a normal boiling point of −129° C. When it is desired to separate a mixture comprising at least two species having close boiling points, then a first separation by, for example, condensation is made between the various species having boiling points not too close from each other in order to provide substantially pure species or a mixture of species having close boiling points. Then, the mixture of species having close boiling points are separated by another process, for example, adsorption when one of the species of the mixture is more polar than the other. $NF_3$ and $CF_4$ may be separated using molecular seives (such as NaX, CaX, and NaA, wherein the "A" designates 5 Angstrom cage size, and the "X" designates a 10 Angstrom cage size); activated carbon; or the like, wherein the polar species (such as $NF_3$ and $CHF_3$) are preferentially adsorbed, as opposed to non-polar species such as $CF_4$.

Secondary Abatement

The scrubber means to remove the harmful product for the membrane can be a dry scrubber (which usually removes at least $F_2$, HF, HCl, HBr, $Cl_2$, $NH_3$, $WF_6$ and $SiH_4$). Dry scrubbers are usually resin-type scrubbers, or soda-lime, while some dry scrubbers comprising catalysts like $MnO_2$ can also remove ozone. Also, gaseous hydrides may be removed according to the methods disclosed in U.S. Pat. Nos. 4,743,435; 4,784,837; 4,910,001; 4,996,030, 5,182,088 and 5,378,439 incorporated herein by reference. When different scrubbers have to be installed in order to remove the various harmful constituents, it is preferred to install first the dry scrubber (or scrubbers) and then the wet scrubber. Upstream before the scrubbers, filters to remove particles from the stream are usually necessary (removal of particles having a diameter larger than 20 microns) and it is recommended according to the invention to provide a filter upstream having a pore size diameter less than 20 micrometers and preferably less than 10 micrometers, which removes particles and liquid droplets to avoid plugging of the membrane.

A wet scrubber is, for example, disclosed in the brochure entitled "Selecting a CDO™ for your Particular Application" from DELATECH Corporation, which brochure is incorporated herein by reference.

Figure 2:
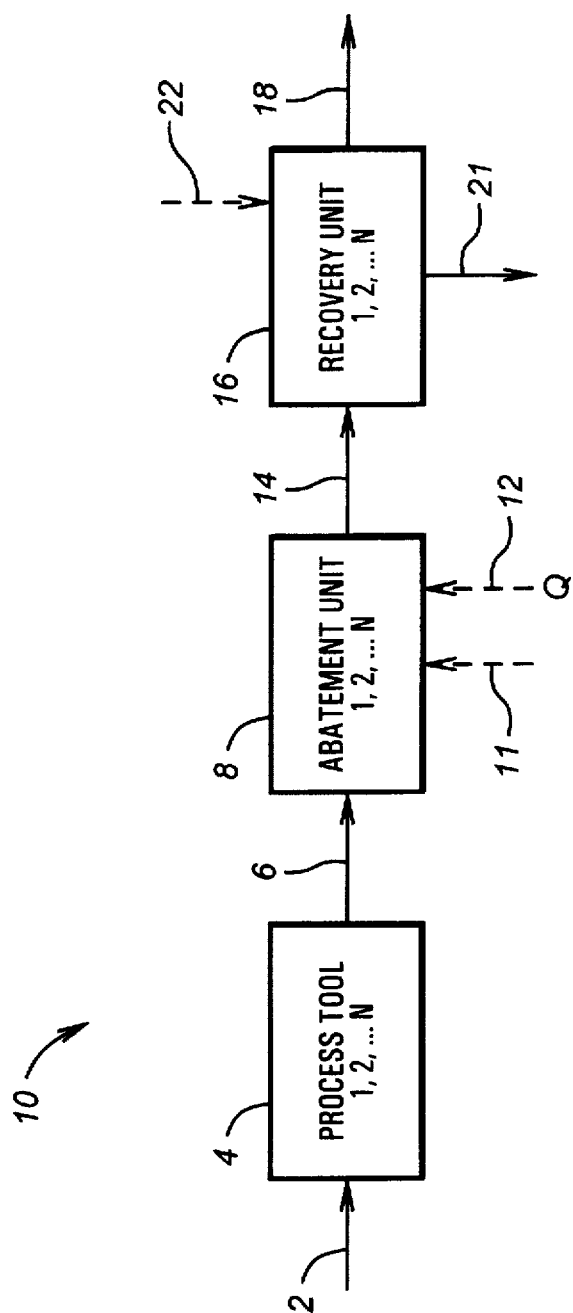
FIG. 2 is a schematic illustration of a generic hybrid system of the invention, illustrating abatement and recovery unit operations.

The general features of a process according to the invention are illustrated in FIG. 2, wherein a semiconductor manufacturing process is represented by the reference numeral 20 (which may be any type of process using PFCs and rejecting PFCs). The PFCs and carrier gases feed to process tool 4 are represented by 2 (bulk and/or cylinder delivery through traditional bulk systems or gas cabinets well known in the electronic industry).

A waste gas mixture of PFCs, carrier gases and any other gases 6 (such as chemical gases) is recovered from process tool 4 on an exhaust line 6. The gas mixture is then routed to an abatement unit 8 to remove most of reactive species, according to the nature of the gas mixture provided in 6. Optional streams may be necessary, depending upon the abatement unit operation chosen, for example, if the abatement unit is a combustion apparatus, then stream 11 may be air or oxygen. Heat (designated in FIG. 2 by "Q") may need to be supplied via stream 12, for example, if the abatement unit is a thermal-chemical unit. A gas mixture in 14 no longer containing any substantial amount of harmful component for a polymeric membrane is routed to a recovery unit 16, which may comprise one or more sub-units, as further explained herein. For example, recovery unit 16 may actually comprise first a wet scrubber and then a membrane separation unit. Therefore, allowance is made for optional streams 22, such as water stream, and waste stream 21. Gas stream 18 designates the abated and recovered PFC non-permeate stream. The non-permeate stream which comprises the PFCs (concentrated) may be recovered and either directly recycled to process tool 4 (or stored in bulk to be later reused in process tool 4 or a different process tool).

Figure 3:
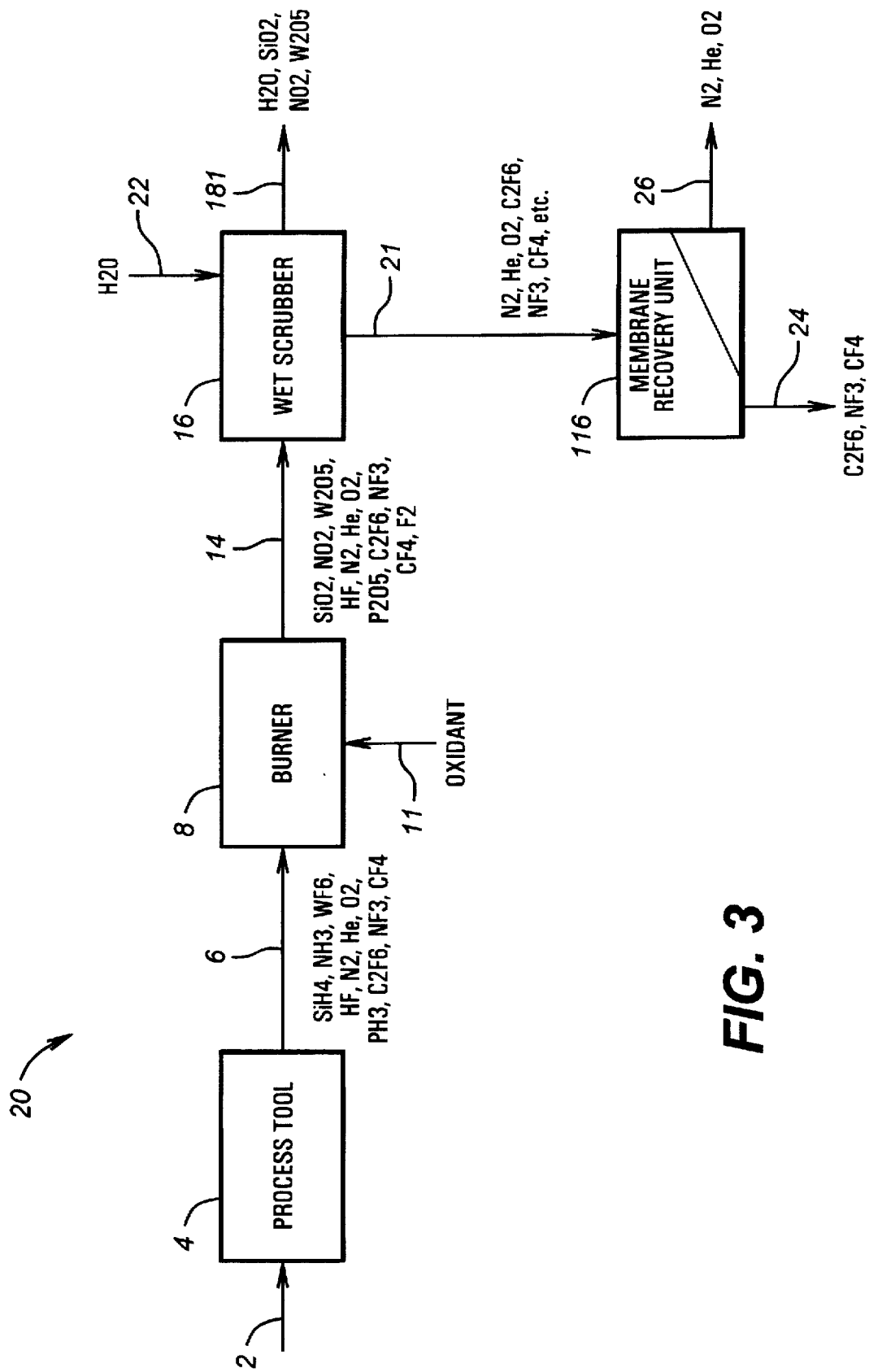
FIG. 3 is a schematic illustration of a first specific hybrid system of the invention, illustrating combustion, wet scrubbing and membrane recovery unit operations.

FIG. 3 is a schematic illustration of a first specific hybrid system of the invention, illustrating a combustion abatement unit (burner) 8, a wet scrubber unit 16 and a membrane recovery unit 116. Stream 6 may have the indicated composition of $SiH_4$, $NH_3$, $WF_6$, HF, $N_2$, He, $O_2$, $PH_3$, $C_2F_6$, $NF_3$, and $CF_4$, such as might be the effluent from a CVD reactor. The abatement unit 8 typically and preferably comprises a unit known under the trade designation CDO, from Delatech Corporation, as previously described herein, having an oxygenator subunit and a thermal reaction subunit. In the thermal reaction sub-unit, the following reactions occur:

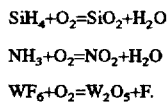

$$SiH_4+O_2=SiO_2+H_2O$$

$$NH_3+O_2=NO_2+H_2O$$

$$WF_6+O_2=W_2O_5+F.$$

The effluent stream 14 from the abatement unit would preferably then comprise $SiO_2$, $NO_2$, $W_2O_5$, HF, $N_2$, He, $P_2O_5$, $C_2F_6$, $NF_3$, $CF_4$, and F, along with some particulate species. In wet scrubber unit 16, water 22 is used to scrub out $SiO_2$, $NO_2$ and $W_2O_5$, to stream 181 while the remaining gases in stream 14 discharge from wet scrubber 16 as stream 21 and pass to a membrane unit 116, producing a non-permeate stream 24 rich in PFCs, and permeate stream 26 comprising carrier gases $N_2$, He, and residual $O_2$.

Figure 4:
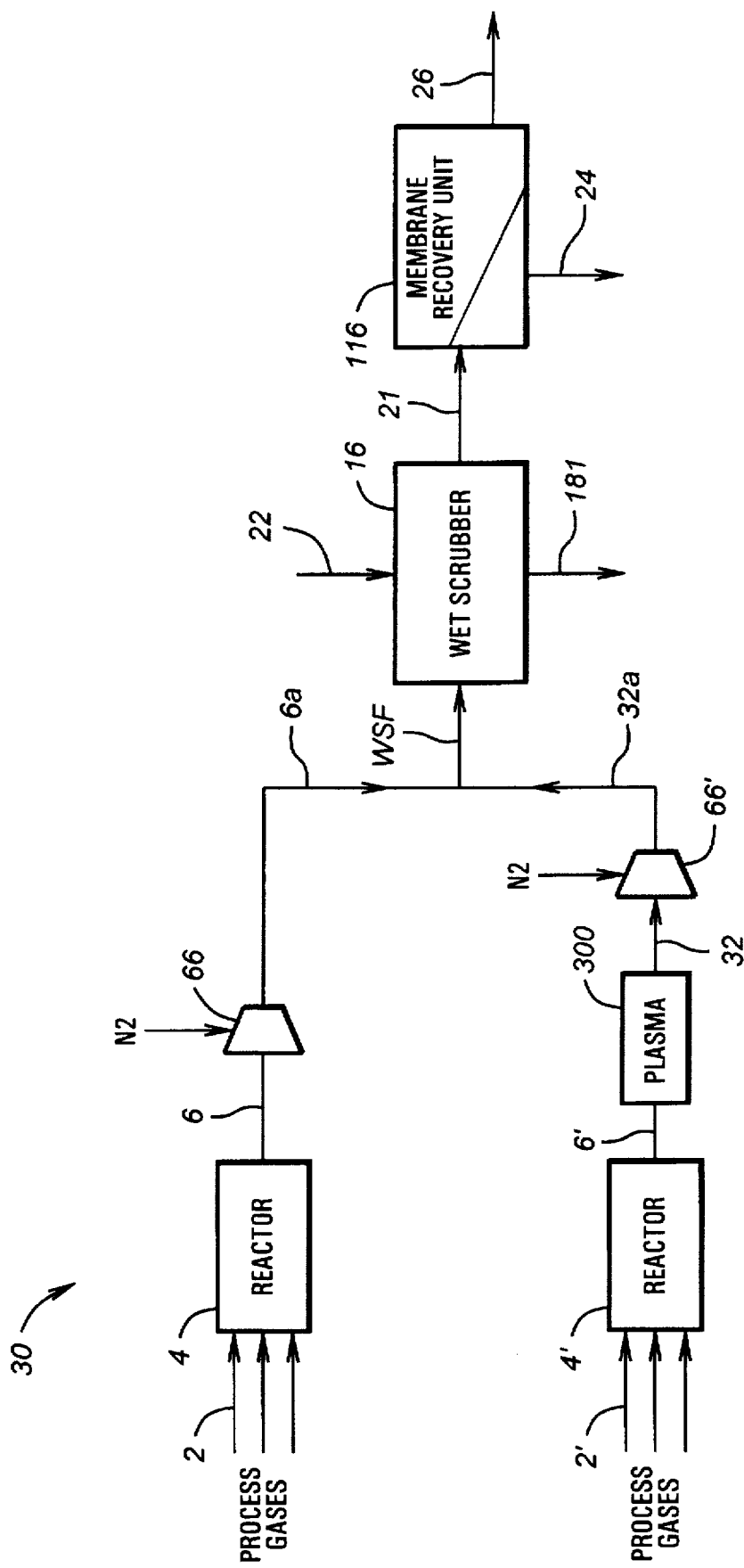
FIG. 4 is a schematic illustration of a second specific hybrid system of the invention, illustrating plasma, wet scrubbing and membrane recovery unit operations.

FIG. 4 is a schematic illustration of a second specific hybrid system of the invention, illustrating plasma, wet scrubbing and membrane recovery unit operations in a parallel processing embodiment. This system and process are useful in recovering PFCs from a set of tools producing effluent streams containing different chemical species. Process gas streams 2 and 2' enter reactors 4 and 4', respectively, producing effluent streams 6 and 6'. Effluent stream 6' is directed to a plasma abatement unit 300 to produce a plasma unit effluent stream 32 devoid of $WF_6$, and stream 6 and 32 are compressed and diluted with nitrogen in compressors 66 and 66', respectively. Compressed streams 6a and 32a, emanating from compressors 66 and 66', respectively, are combined into a single waste stream which is a wet scrubber feed (WSF) stream, which flows into a wet scrubber 16, which abates hydrides. The scrubbed stream 21 is then sent to the membrane unit 116, wherein a non-permeate stream 24, enriched in PFCs is produced, and a permeate stream rich in carrier gases is emitted as stream 26.

It is important to note that for all these different embodiments of the invention, it may in some instances be preferred to create a pressure drop across the membrane. In one embodiment this may be done by creating vacuum on the permeate side of the membrane while keeping the feed gas at about atmospheric pressure, which is usually about the pressure of the gas mixture released from the semiconductor manufacturing process. As long as usually only the carrier gases permeate through the membrane, those gases cannot damage a vacuum pump or other vacuum system, while on the contrary, compressing the gas mixture upstream from the membrane would not only mean compressing more gas, but it would also mean a risk for the compressor means.

Figure 5:
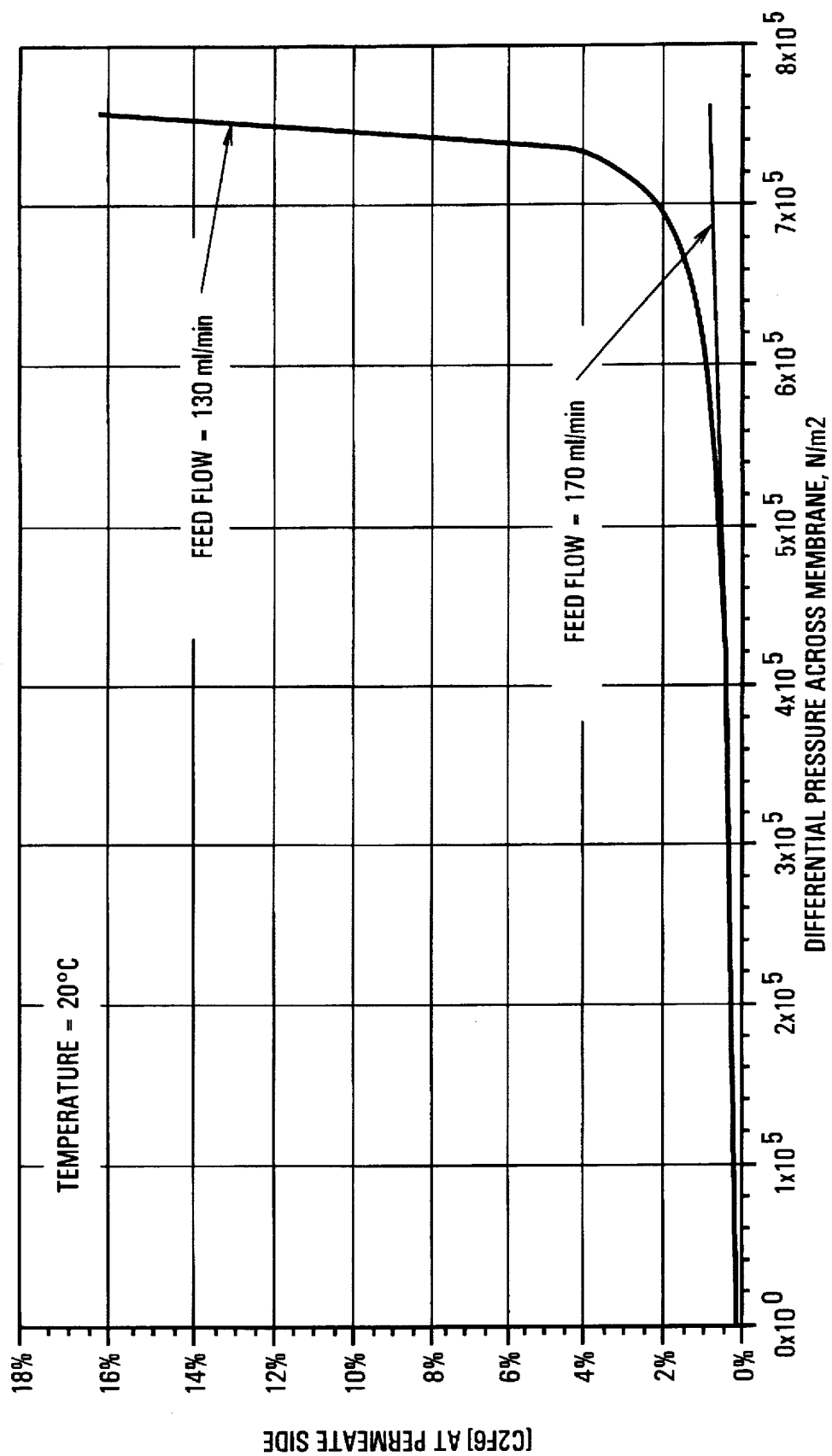
FIG. 5 illustrates PFC concentration on the residue side (permeate) of the membrane versus the pressure differential across the membrane, for different flowrates of the feed stream.

FIG. 5 illustrates at 20° C. for two different flowrates of the feed flow of 170 ml/min and 130 ml/min, respectively, on a hollow-fiber membrane made of polyimide having a surface of about 0.2 m² wherein the feed flow is sent into the hollow fiber with a permeation towards the outside hollow fiber. FIG. 5 clearly illustrates for low pressure drop between the non-permeate and the permeate sides of the membrane, no concentration of $C_2F_6$ occurs (0.2% of $C_2F_6$ recovered on the non-permeate side with the "residue"). For higher pressure drops, depending on the feed flow, the concentration of $C_2F_6$ then increases with an onset point of about $7\times10^5$ $^{N/m2}$ ($\Delta P$ across the membrane) for a feed flow of 130 ml/min. For higher flowrates (170 ml/min.) the onset point is obviously higher (increases with feed flow).

Figure 6:
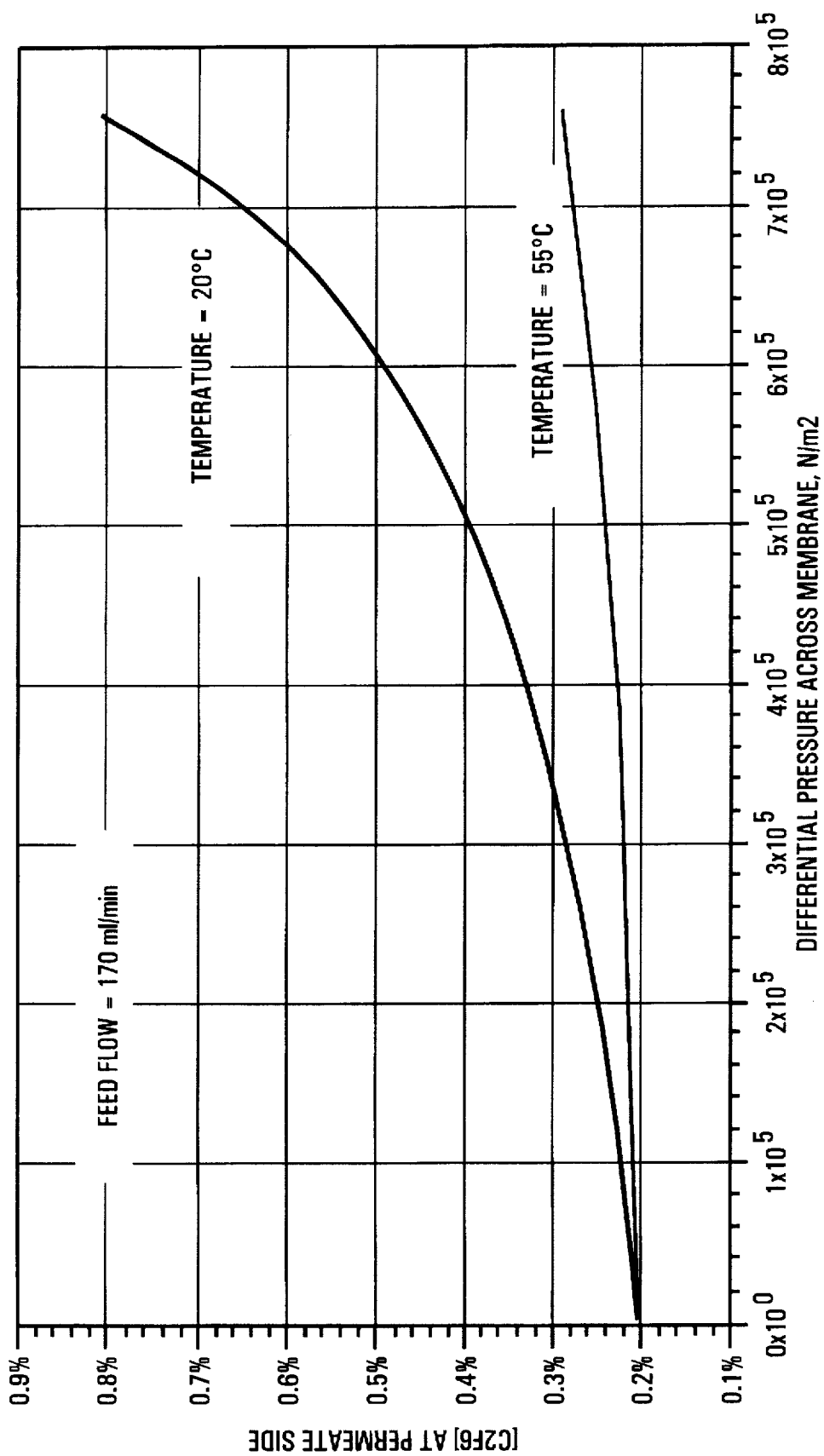
FIG. 6 illustrates PFC concentration on the residue side (permeate) of the membrane versus the pressure differential across the membrane, for different temperatures of the feed flow.

FIG. 6 illustrates the effect of the temperature of the feed flow (or of the membrane)—same membrane as used for FIG. 5. For a higher temperature of the flow, a higher differential pressure across the membrane is needed to achieve the same concentration of PFCs.

Figure 7:
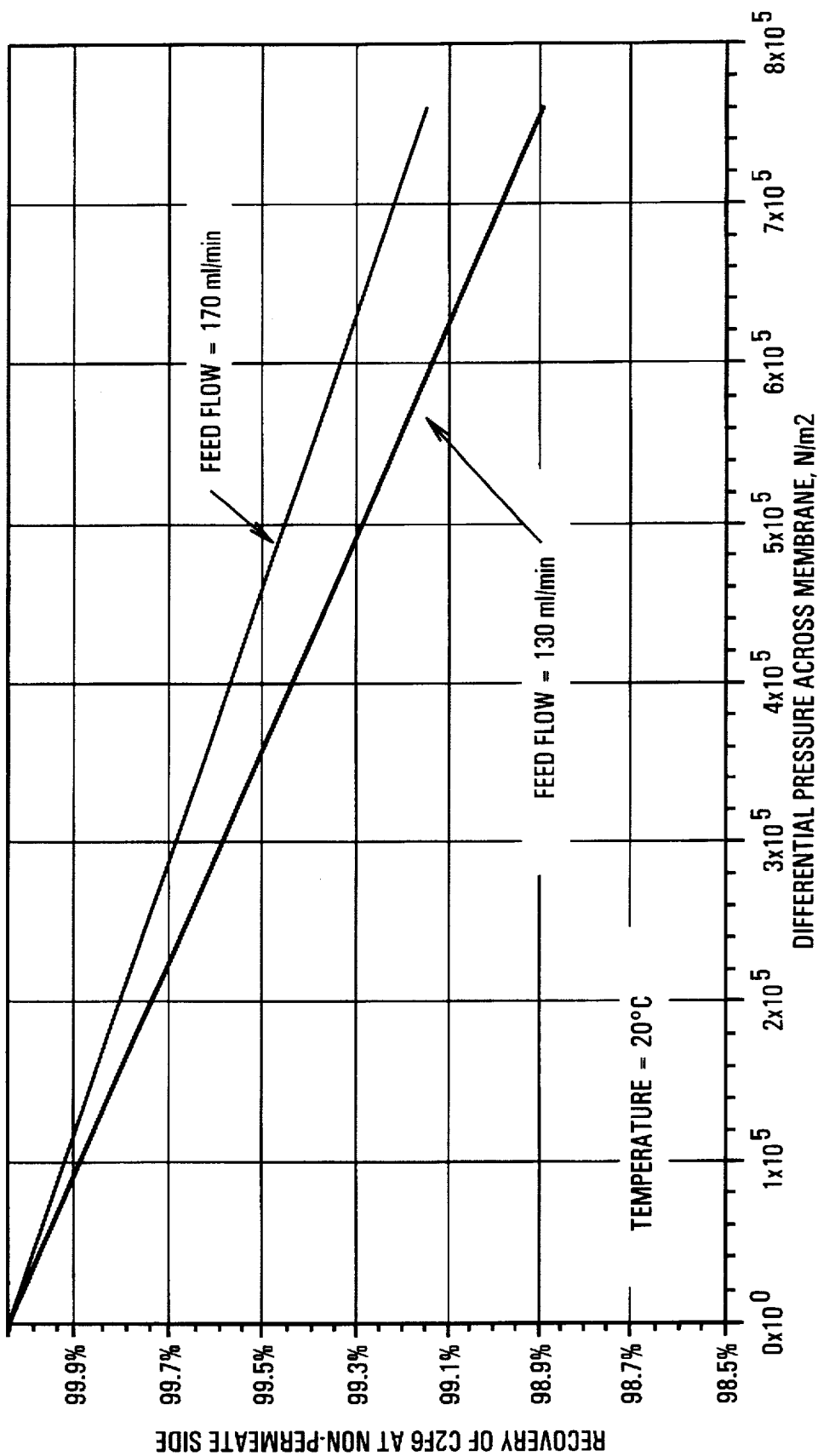
FIG. 7 illustrates PFC concentration on the recovery side (non-permeate side) of the membrane versus the pressure differential across the membrane, for different flowrates of the feed stream.

FIG. 7 illustrates the recovery rate of $C_2F_6$ on the non-permeate side of the membrane versus the differential pressure across the membrane for two different flowrates: for very low differential pressure, about all of the $C_2F_6$ is recovered while the rate of $C_2F_6$ permeating through the membrane progressively increases with the pressure drop across the membrane, such rate increasing faster for lower flowrates (compare curves for 130 ml/min. and 170 ml/min).

Figure 8:
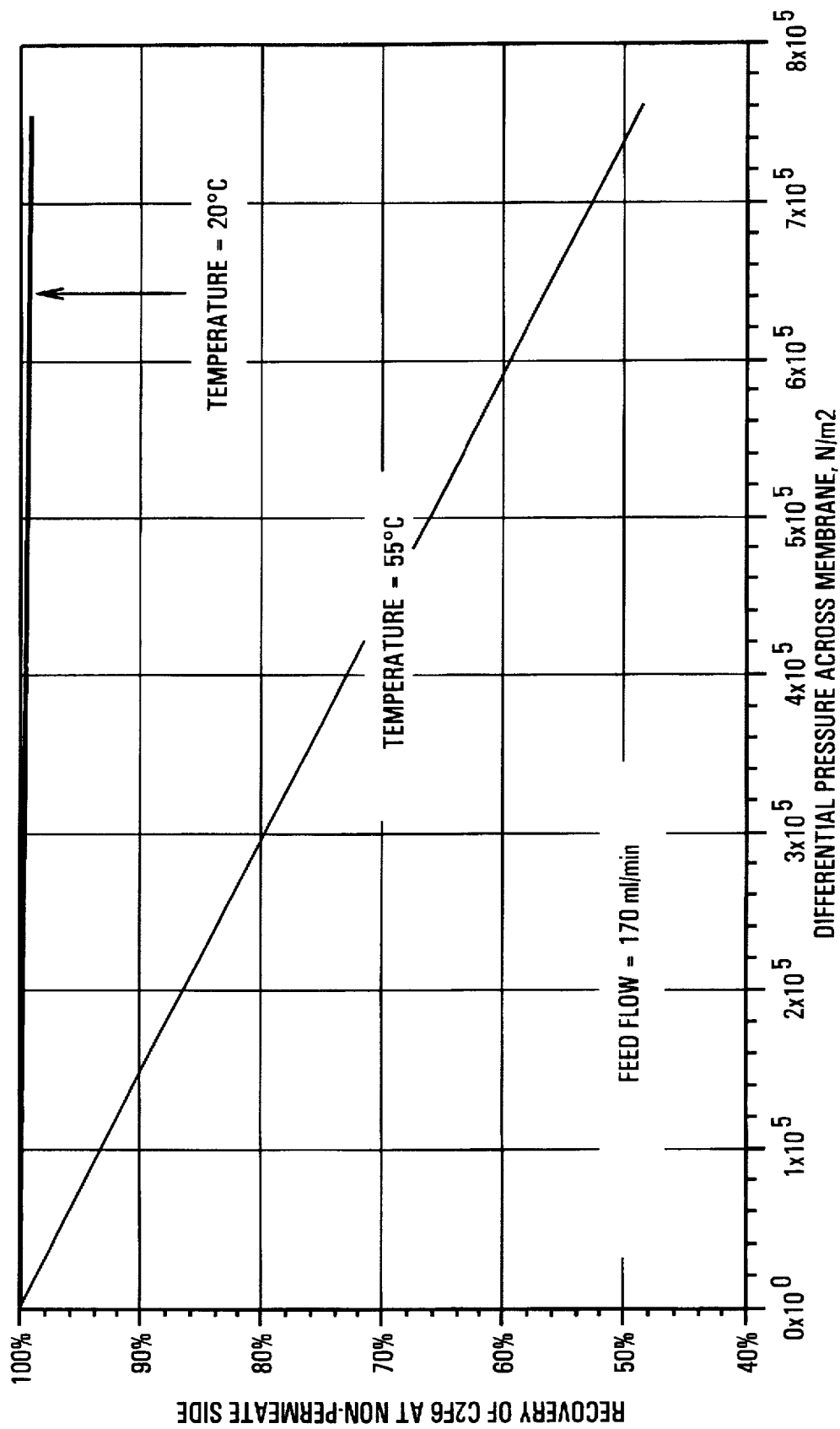
FIG. 8 illustrates PFC concentration on the recovery side (non-permeate side) of the membrane versus the pressure differential across the membrane, for different temperatures of the feed flow.

FIG. 8 illustrates the effect of temperature for a flow of 170 ml/min.: while only an extremely low amount of $C_2F_6$ permeates at 20° C., almost half of it permeates at 55° C. for a pressure drop of about $7\times10^5$ N/m².

From a recovery standpoint (FIGS. 7 and 8), it is thus better to operate at high flowrates and ambient temperature for a given pressure drop.

Both FIGS. 5 and 6 indicate that a substantial pressure drop is necessary to have a certain purity of $C_2F_6$ (and thus a certain concentration).

Further modifications to the invention will be apparent to those skilled in the art, and the scope of the following claims are intended not to be unfairly limited by the foregoing description.

What is claimed is:

1. A process to recover at least one perfluorocompound gas from a gas mixture comprising reactive gases, perfluorocompound gases, and carrier gases, the process comprising the steps of:
   a) providing a gas mixture comprising at least one perfluorocompound gas, at least one carrier gas, and at least one reactive gas;
   b) directing the gas mixture to an abatement unit, wherein a major portion of the reactive gases are converted into substantially inert species, and thereby forming an intermediate gas mixture consisting essentially of the perfluorocompound gases and the carrier gases;
   c) providing at least one membrane unit having a plurality of hollow fiber glassy polymer membranes, the membrane unit having a feed side and a permeate side, the hollow fibers of the membrane unit being permeable to the at least one carrier gas and being non-permeable to the at least one perfluorocompound gases;

d) contacting the feed side of the at least one membrane unit with the intermediate gas mixture, the intermediate gas mixture being at a predetermined pressure;

e) withdrawing from the feed side of the membrane unit as a first non-permeate stream at a pressure which is substantially equal to the predetermined pressure, a concentrated gas mixture comprising essentially the at least one perfluorocompound gas; and f) withdrawing from the permeate side of the at least one membrane unit as a permeate stream a depleted gas mixture consisting essentially of the at least one carrier gas.

2. Process in accordance with claim 1 wherein said predetermined pressure is supplied by compressing said gas mixture with a sealed, oil-free compressor.

3. Process in accordance with claim 1 wherein said feed side of the membrane unit comprises a bore side of each of said plurality of hollow fiber and glassy polymer membranes, while the permeate side is an outside of each hollow fiber glassy polymer membrane.

4. Process in accordance with claim 1 wherein said gas mixture comprises an effluent stream from a process selected from the group consisting of etching processes including oxide, metal and dielectric; deposition processes including silicon CVD, tungsten backetching, and dry chamber cleaning.

5. A process according to claim 1, wherein the at least one perfluorocompound gas is selected from the group consisting of $CF_4$, $CHF_3$, $C_2F_6$, $NF_3$, $SF_6$, $C_3F_8$ and mixtures thereof.

6. A process according to claim 1, wherein the carrier gas is selected from the group consisting of Ar, $N_2$, Kr, Xe, Ne, $O_2$, He, $H_2$, Air and mixtures thereof.

7. A process according to claim 1, wherein the glassy polymer membrane is made of at least one polymer selected from the group consisting of polyimides, polyamides, polyamides-mides, polyesters, polycarbonates, polysulfones, polyethersulfone, polyetherketone, alkyl substituted aromatic polyesters, blends of polyethersulfone, fluorinated aromatic polyimides, polyamides and polyamide-imides, copolymers thereof, substituted polymers thereof.

8. A process according to claim 1 wherein the membranes each comprise a core and a skin which are made of different polymers, the permeability of the polymer of the skin being lower for perfluorocompound than for nitrogen.

9. A process according to claim 1 wherein the intermediate gas mixture which is contacted with the membrane comprises less than 1% vol. of said reactive gases.

10. A process according to claim 1 wherein the intermediate gas mixture which is contacted with the membrane comprises less than 10 ppm of said reactive gases.

11. A process according to claim 1 wherein the intermediate gas mixture which is contacted with the membrane comprises less than 1 ppm of said reactive gases.

12. A process according to claim 1 wherein the intermediate gas mixture prior to being fed to the membrane, is brought to a pressure which is effective for carrying out the separation of the perfluorocompound gas or gas mixture in order to recover said first non-permeate stream which is concentrated in perfluorocompound species compared to the gas mixture.

13. A process according to claim 1 wherein the pressure of the intermediate gas mixture ranges from about $10^5$ Pascal to about $10^6$ Pascal.

14. A process according to claim 1, wherein the first non-permeate stream is compressed and/or cooled, and stored in storage means for further processing.

15. A process according to claim 1, wherein at least a portion of the first non-permeate stream is recycled.

16. Process in accordance with claim 15 wherein the portion of the first non-permeate stream which is recycled is routed to a surge tank prior to re-entering the process, or prior to being routed to storage.

17. A process according to claim 1, wherein the gas mixture comprising essentially the at least one perfluorocompound gas comprises gases selected from the group consisting of $SF_6$, $C_2F_6$, $CHF_3$, $CF_4$ and $NF_3$.

18. A process according to claim 1, wherein at least one of the perfluorocompound gases of the first non-permeate stream is further separated from other perfluorocompounds in said first non-permeate stream via a separation step.

19. A process according to claim 18 wherein said separation step employs a heat exchanger using a cooling fluid at an effective temperature and flowrate.

20. A process according to claim 18 wherein at least a portion of the first non-permeate stream consists essentially of $NF_3$ and $CF_4$ and said separation step is an adsorption step wherein $NF_3$ is adsorbed and $CF_4$ is not.

21. A process according to claim 18 wherein at least a portion of the first non-permeate stream consists essentially of $CHF_3$ and $C_2F_6$, and said separation step is an adsorption system wherein $CHF_3$ is adsorbed and $C_2F_6$ is not.

22. A process according to claim 1 wherein the intermediate gas has a temperature ranging from about 20° C. to 120° C.

23. Process in accordance with claim 1 wherein at least a portion of the first non-permeate stream is used as a sweep gas on feed side of the membrane.

24. Process in accordance with claim 1 wherein said gas mixture is emitted from a plurality of like or unlike semiconductor manufacturing tools.

25. Process in accordance with claim 1 wherein said abatement unit is selected from the group consisting of plasma decomposition, thermal decomposition, catalytic decomposition, scrubbing, and adsorption.

26. A process to recover at least one perfluorocompound gas from a gas mixture flowing from a semiconductor manufacturing tool, the gas mixture comprising at least one carrier gas and at least one reactive gas, the process comprising the steps of:

a) directing the gas mixture to an abatement unit, wherein a major portion of the reactive gases are converted into substantially inert species, and thereby forming an intermediate gas mixture consisting essentially of the perfluorocompound gases and the carrier gases;

b) directing the intermediate gas mixture into a feed side of at least one membrane unit having a plurality of hollow fiber glassy polymer membranes, the membrane unit having a permeate side, each hollow fiber glassy polymer membrane of the membrane unit being permeable to the at least one carrier gas and being non-permeable to the at least one perfluorocompound gases;

c) withdrawing from the feed side of the membrane unit as a non-permeate stream at a pressure which is substantially equal to the predetermined pressure, a concentrated gas mixture comprising essentially the at least one perfluorocompound gas; and d) withdrawing from the permeate side of the at least one membrane as a permeate stream a depleted gas mixture consisting essentially of the at least one carrier gas.

27. A system combining abatement and recovery units for treating gas mixtures comprising a perfluorocompound gas, a reactive gas, and a carrier gas, the system comprising:

a) an abatement unit adapted to receive the gas mixture, the abatement unit selected from the group consisting of combustion, thermal-chemical, plasma decomposers, pulsed corona reactors, and combinations thereof, the abatement unit adapted to produce an intermediate gas mixture consisting essentially of the perfluorocompound gas and the carrier gas; and b) at least one membrane separation unit having a feed side and a permeate side, and comprising a plurality of glassy polymer hollow fibers, the glassy polymer hollow fibers being permeable to the carrier gas and being substantially non-permeable to at least one perfluorocompound gas, the membrane unit connected to the abatement unit via an abatement unit effluent conduit, the membrane unit having a permeate vent conduit and a non-permeate conduit.

28. System in accordance with claim 27 wherein the non-permeate conduit is adapted to be removably connected to a processing tool, the processing tool adapted to use the perfluorocompound gases.

29. System in accordance with claim 28 wherein the processing tool is a semiconductor manufacturing tool.

30. System in accordance with claim 29 wherein the semiconductor manufacturing tool is selected from the group consisting of etching tools, deposition tools, tungsten backetching tools, and dry chambers.

31. System in accordance with claim 27 including the provision of a compressor, heat exchanger, cryogenic pump or vacuum pump in the non-permeate conduit.

32. A system combining abatement and recovery units for treating gas mixtures comprising a perfluorocompound gas, a reactive gas, and a carrier gas, the system comprising:

a) an abatement unit adapted to receive the gas mixture, the abatement unit selected from the group consisting of combustion, thermal-chemical, plasma decomposers, pulsed corona reactors, and combinations thereof, the abatement unit adapted to produce an intermediate gas mixture consisting essentially of the perfluorocompound gas and the carrier gas;

b) a compressor connected to the abatement unit through an abatement unit discharge conduit, the compressor adapted to provide a compressed intermediate gas mixture through a compressor discharge conduit;

c) optional heating or cooling means in the compressor discharge conduit adapted to provide a desired compressed intermediate gas temperature; and d) at least one membrane separation unit having a feed side and a permeate side, and comprising a plurality of glassy polymer hollow fibers, the glassy polymer hollow fibers being permeable to the carrier gas and being substantially non-permeable to at least one perfluorocompound gas, the membrane unit connected to the compressor via the compressor discharge conduit, the membrane unit having a permeate vent conduit and a non-permeate conduit.

33. System in accordance with claim 32 adapted to receive a plurality of gas mixtures in a parallel operating mode, wherein at least two of the gas mixtures have differing gas compositions requiring differing abatement units.

* * * * *

UNITED STATES PATENT AND TRADEMARK OFFICE
CERTIFICATE OF CORRECTION

PATENT NO. : 5,759,237
DATED : Jun. 2, 1998
INVENTOR(S) : Li et al.

It is certified that error appears in the above-identified patent and that said Letters Patent is hereby corrected as shown below:

In Claim 7, line 39, after "polyamides-", please insert --i--, to make the word "polyamides-imides.

Signed and Sealed this

Twenty-second Day of September, 1998

*Attest:*

BRUCE LEHMAN

*Attesting Officer*   *Commissioner of Patents and Trademarks*